March 6, 1973   R. PUCKETT ET AL   3,719,386
EXPANSIBLE TRAILERS

Filed July 22, 1970   4 Sheets-Sheet 3

INVENTORS.
RAY PUCKETT &
SIDNEY K. LAMBERT

BY
Dunlap, Laney, Hessin & Dougherty
ATTORNEYS

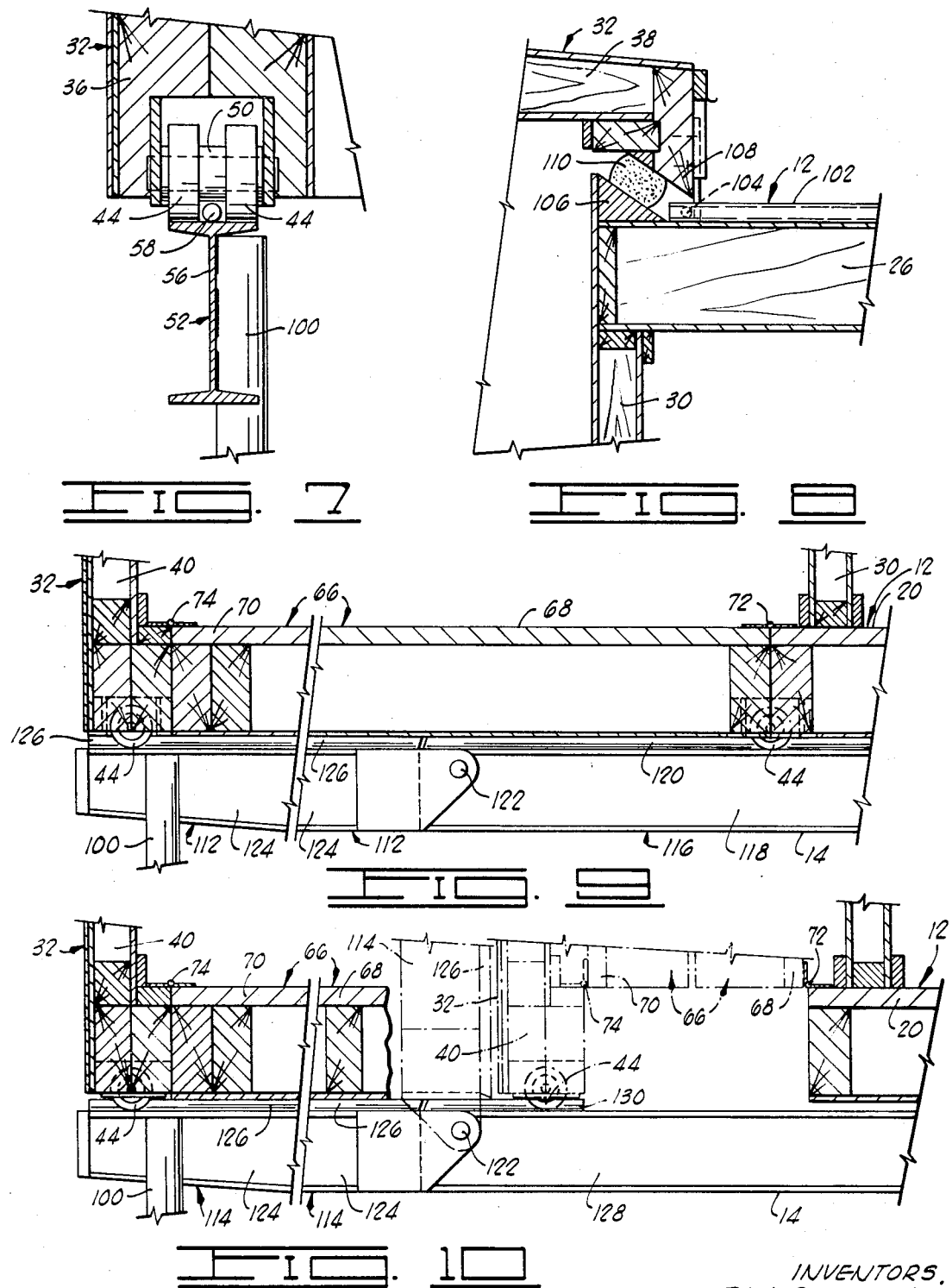

United States Patent Office 3,719,386
Patented Mar. 6, 1973

3,719,386
EXPANSIBLE TRAILERS
Ray Puckett, 3008 10th St., Wichita Falls, Tex. 76309, and Sidney K. Lambert, Wichita Falls, Tex.; said Lambert assignor to said Puckett
Filed July 22, 1970, Ser. No. 57,229
Int. Cl. B60g 3/34
U.S. Cl. 296—26  9 Claims

ABSTRACT OF THE DISCLOSURE

An expansible trailer having a pair of telescoping trailer sections and a folding floor unit within one of the trailer sections. The telescoping trailer sections are relatively extended and retracted by a hydraulically actuated linking mechanism. Folding floor joists for supporting the extended trailer section are also disclosed. Tracks and rollers for guiding the extended trailer sections are also disclosed.

BACKGROUND OF THE INVENTION (1) Field of the invention

This invention relates generally to improvements in house trailers, and more particularly, but not by way of limitation, to an improved expansible house trailer.

(2) Description of the prior art

In expansible house trailers, the prior structures generally comprise a chassis, a rigid framework with side portions adapted for relative expansion to provide additional floor space, and means to effect this expansion. Prior to the present invention, no feasible means has been designed for expanding and retracting the trailer sections.

The desire for such an expansible trailer comes about because of width limitations placed on trailers that are to travel over the highways. The most common solution to the problem of width limitations is the construction of extremely long, narrow house trailers which, as a result, exhibit inconvenient floor plans and extremely limited mobility on the highway.

SUMMARY OF THE INVENTION

An object of the invention is to provide an expansible trailer capable of being laterally expanded to substantially twice its collapsed width, or, alternately, retracted from its expanded position in a short time with a minimum of effort.

Another object of the invention is to provide an expansible trailer which employs novel means for guiding and supporting the movable section of the trailer, and a novel power drive means for effecting such movement so that virtually no manual labor is required to expand or contract the trailer.

A further object of the invention is to provide an expansible trailer so arranged that the floor of the movable trailer section automatically unfolds and folds with the simultaneous relative extension and retraction of the trailer sections.

A still further object of the invention is to provide an expansible trailer which may be economically constructed, which will be simple and easy to operate, and which may be easily and economically maintained or repaired.

Other objects and advantages of the invention will be evident from the following detailed description when read in conjunction with the accompanying drawings.

BRIEF DESCRIPTION OF THE DRAWINGS

FIG. 7 is a fragmentary view illustrating roller and track detail taken along lines 7—7 of FIG. 5.

FIG. 8 is a fragmentary view illustrating compressible seal and roof roller detail taken along lines 8—8 of FIG. 1.

FIG. 9 is a fragmentary view similar to FIG. 5 showing end rollers and tracks in another embodiment.

FIG. 10 is a fragmentary view similar to FIG. 6 showing intermediate rollers and tracks in another embodiment.

EMBODIMENT OF FIGS. 1 THROUGH 8

Figure 1:
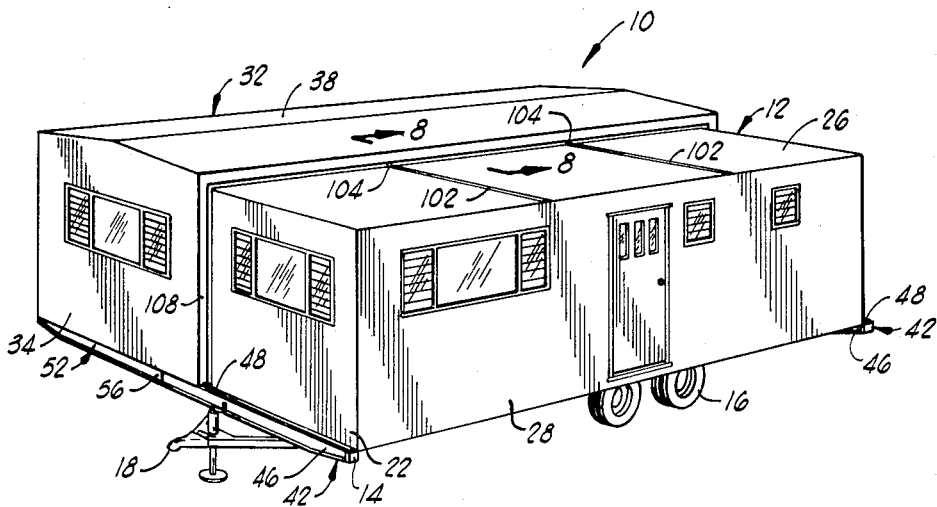
FIG. 1 is a perspective view of an expansible trailer constructed in accordance with this invention.
Figure 2:
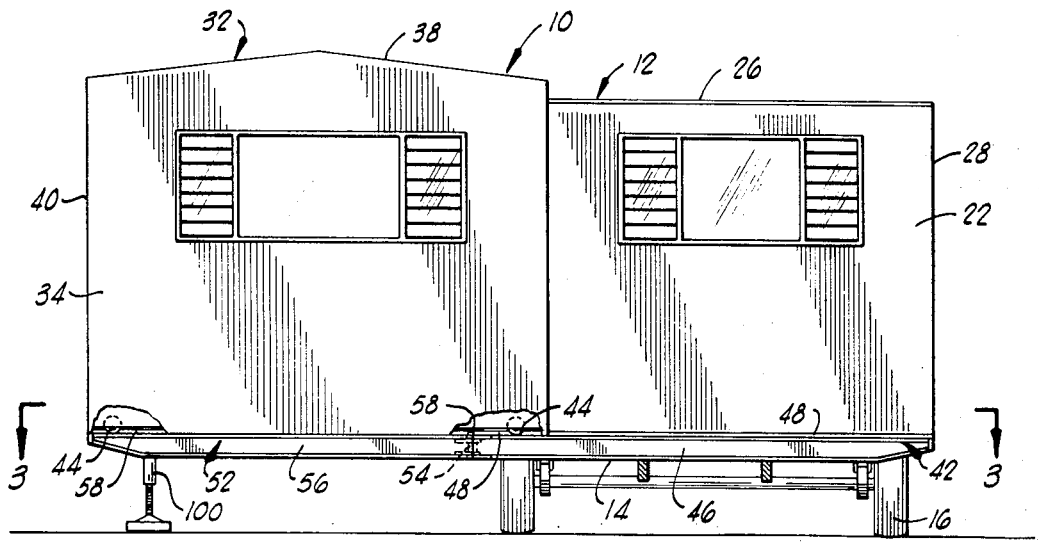
FIG. 2 is an end view of the expansible trailer in an expanded position.
Figure 3:
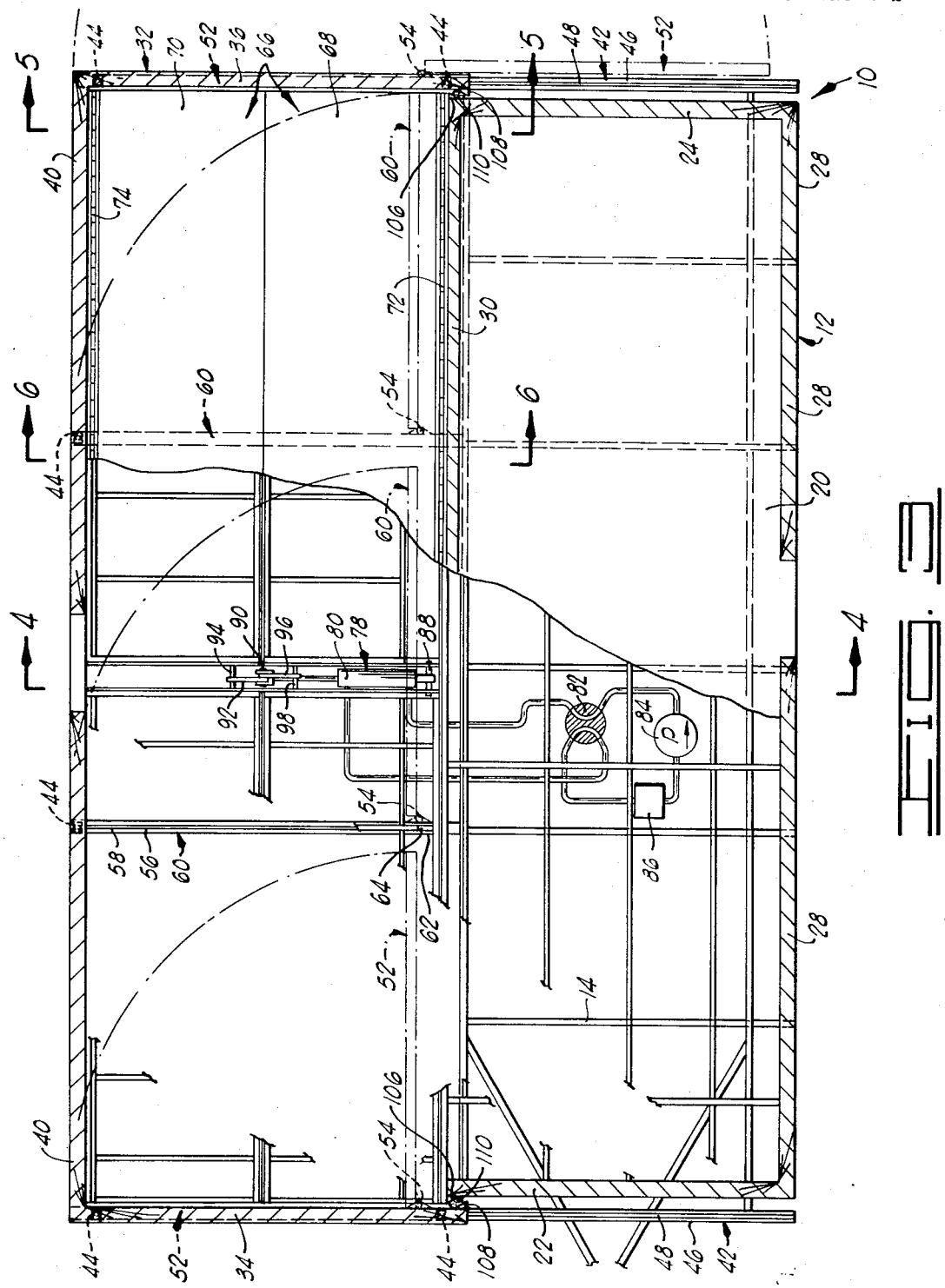
FIG. 3 is a substantially diagrammatical sectional view with sections of the trailer floor broken away and taken along lines 3—3 of FIG. 2.

Referring to the drawings in detail, and particularly FIGS. 1, 2, 3 and 4, reference character 10 generally designates a trailer constructed in accordance with this invention and basically comprising a fixed trailer section 12 mounted on a chassis 14 supported by a wheel unit 16. One end of the chassis protrudes to the front and is provided with a conventional trailer hitch 18. The fixed trailer section 12 is provided with a floor 20, a front wall 22, a rear wall 24, a roof 26, an exterior side wall 28, and an interior side wall 30. The physical proportions of the fixed trailer section 12 are substantially the same as those of a conventional house trailer.

A movable trailer section 32, having a front wall 34, a rear wall 36, a roof 38, and a single side wall 40 is adapted to telescope over the fixed trailer section 12. The two sections, when telescoped, have an overall width substantially equal to that of a conventional house trailer; but when the movable trailer section 32 is extended, the combined overall width of the two sections is approximately twice the width of a conventional house trailer.

To provide for the telescoping extension and retraction of the movable trailer section 32 relative to the fixed trailer section 12, the fixed trailer section 12 is provided at the floor level forward of its front wall 22 and rearward of its rear wall 24, with respective track members 42.

The bottom edges of the front wall 34 and rear wall 36 of the movable trailer section 32 overlie the respective track members 42 when in the retracted position and are provided with rollers 44 to ride on the track members 42. Each track member 42 comprises an I-beam member 46 disposed on edge and a rod 48 welded along the center of the upper flange of the I-beam 46. Each pair of rollers 44 is separated by spacer 50 allowing them to be guided by the respective rod 48 as they roll over the upper flange of the respective I-beam member 46 astride the rod 48.

A folding floor joist 52 is pivotally connected at one end to each of the track members 42 by hinge connection 54. Each floor joist 52 comprises an I-beam member 56 disposed on edge and a rod 58 welded along the center of its upper flange. Each folding floor joist 52 is adapted to swing horizontally to a storage position adjacent to the fixed trailer section 12, and, alternately, to an extended position forming extensions of the respective track members 42 and providing support for the movable trailer section 32 when fully extended and during the extension or retraction operations.

Intermediate the ends of the fixed trailer section 12 are provided two or more folding floor joists 60, each of which is pivotally connected at one end to beam end 62 of the chassis 14 by hinge connection 54. Each folding floor joist 60 is adapted to swing horizontally to a storage position alongside the fixed trailer section 12 and chassis 14, and, alternately, to an extended position providing additional support for the movable trailer section 32 when extended and during extension and retraction. The construction of floor joists 52 and 60 is identical.

The bottom edge of the side wall 40 is provided with rollers 44 which roll on the fully extended floor joists 60 when the movable trailer section 32 is being extended or retracted. The beam ends 62 are adapted to permit the rollers 44 to roll from the floor joists 60 onto the beam ends 62 when the movable trailer section 32 is fully retracted. Each beam end 62 has a short rod 64 welded along the center of its upper flange to guide said rollers 44 as they roll on the beam end 62.

Figure 4:
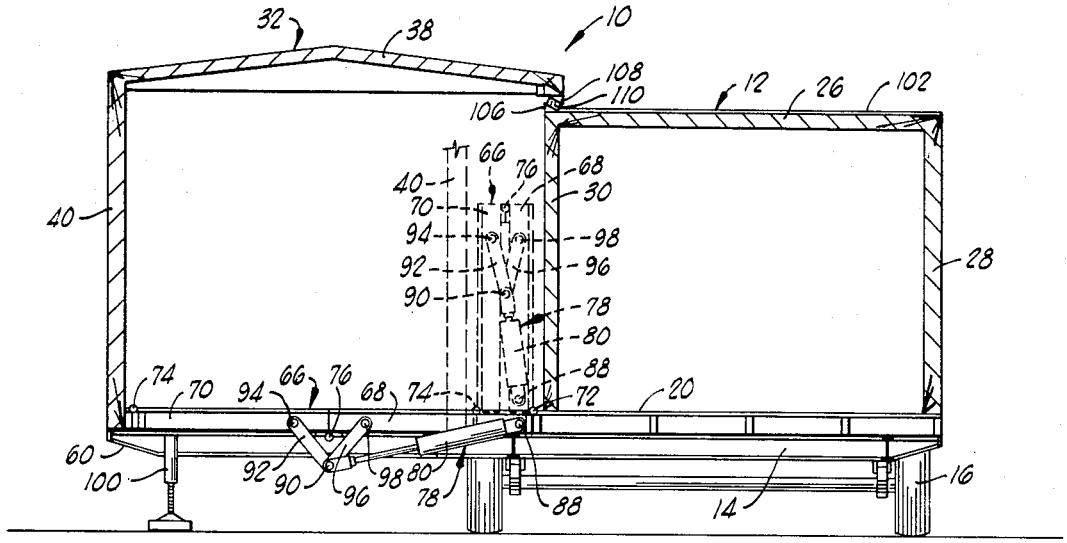
FIG. 4 is a sectional view illustrating the actuating apparatus and general trailer construction taken along lines 4—4 of FIG. 3.
Figure 5:
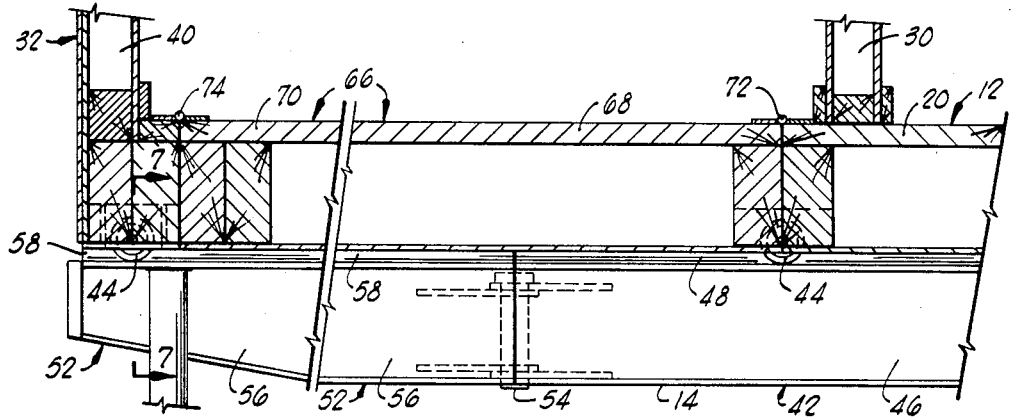
FIG. 5 is a fragmentary view illustrating end rollers and tracks taken along lines 5—5 of FIG. 3.
Figure 6:
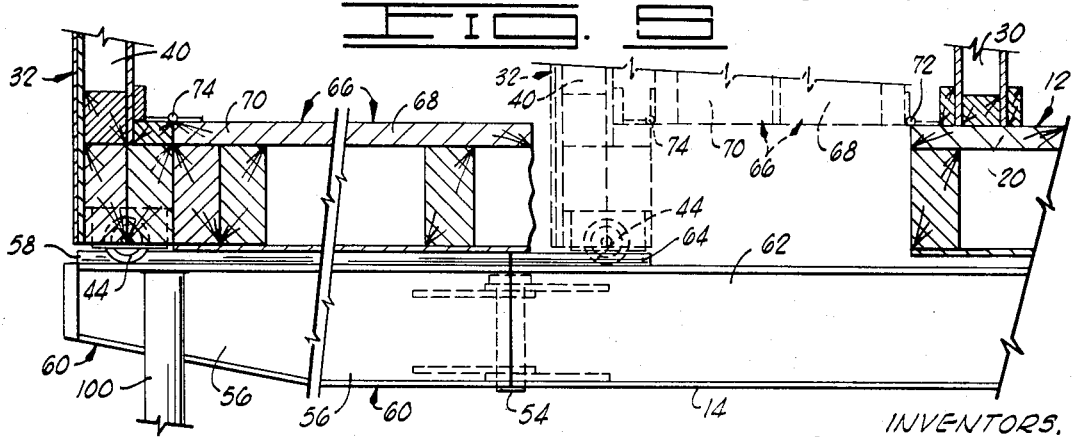
FIG. 6 is a fragmentary view taken along lines 6—6 of FIG. 3 illustrating intermediate rollers and tracks in both extended and retracted trailer positions.

As shown in FIG. 4 the movable trailer section 32 is provided with a folding floor unit 66 comprising a first folding floor section 68 and a second folding floor section 70. The first folding floor section 68 is connected by means of a horizontal hinge 72 to the floor 20 of the fixed trailer section 12. The second folding floor section 70 is connected by means of a horizontal hinge 74 to the bottom margin of the side wall 40. The first folding floor section 68 and the second folding floor section 70 are connected by a horizontal hinge 76.

The movable trailer section 32 is extended and retracted relative to the fixed trailer section 12 by means of a hydraulically actuated mechanism 78 disposed beneath the folding floor unit 66. The hydraulically actuated mechanism 78 employs a two-way hydraulic cylinder 80 controlled by a valve 82 (FIG. 3) so arranged that fluid may be selectively pumped into either end of the cylinder 80 by means of a pump 84. The pump 84 may be either hand operated or motor driven. Return fluid is collected in reservoir 86. It will also be understood that a pneumatic actuator may be substituted for the hydraulic actuator without departing from the spirit and scope of the invention.

The cylinder 80 is connected at one end by bolt 88 to the first folding floor section 68 at a point below the floor level. The cylinder 80 is connected at its opposite end by pin 90 to one end of a first link 92 which is, in turn, connected at its opposite end by pin 94 to the second folding floor section 70. A second link 96 is connected at one end by pin 90 to the first link 92 and the power cylinder 80, and at its opposite end by pin 98 to floor section 68.

When the movable trailer section 32 is in the extended position, suitable jacks 100 may be placed under the outer ends of the folding floor joists 52 and 60 to provide additional support for the movable trailer section 32. The jacks 100 may be arranged to be attached permanently to the folding floor joists 52 and 60.

The roof 26 of the fixed trailer section 12 may be provided with tracks 102 on which ride rollers 104 carried by the roof 38 of the movable trailer section 32.

The front wall 22, rear wall 24, and roof 26 of the fixed trailer section 12 are provided at their margins framing the interior side wall 30 of the fixed trailer section 12 with an outwardly directed flange 106. The corresponding margins of the front wall 34, rear wall 36, and roof 38 of the movable trailer section 32, are provided with an inwardly directed flange 108. The flanges 106 and 108 overlap. Secured along the full length of flange 106 is a compressible seal strip 110 which is engaged and compressed by flange 108 when the movable trailer section 32 is in its fully extended position.

OPERATION OF FIGS. 1 THROUGH 8

Assuming that trailer 10 has been positioned on a suitable site in the fully telescoped position, folding floor joists 52 and 60 are unfolded horizontally from their storage positions adjacent to the fixed trailer section 12 to their fully extended positions. Jacks 100 are then suitably positioned to support the outer ends of the folding floor joists 52 and 60. Valve 82 is turned to the proper position for extension of the movable trailer section 32. Pump 84 provides hydraulic pressure to one end of hydraulic cylinder 80 causing it to extend. As the hydraulic cylinder 80 extends, it exerts forces through links 92 and 96 forcing folding floor sections 68 and 70 of folding floor unit 66 apart about horizontal hinge 76 and, simultaneously, the movable trailer section 32 is automatically extended over the folding floor joists 52 and 60 to its fully extended position. Folding floor sections 68 and 70 fully unfold and form a floor for the movable trailer section 32.

To return trailer 10 to its fully telescoped position, the valve 82 is turned to the proper position for retraction of the movable trailer section 32. Pump 84 provides hydraulic pressure to the opposite end of the hydraulic cylinder 80 causing it to contract. As the hydraulic cylinder 80 contracts, it exerts forces through links 92 and 96 forcing folding floor sections 68 and 70 of folding floor unit 66 upward at hinge 76 and causes the folding floor sections 68 and 70 to fold together vertically about hinge 76 in jack-knife fashion. As the folding floor sections 68 and 70 are being so folded, the movable trailer section 32 is automatically retracted over the folding floor joists 52 and 60. When the folding floor sections 68 and 70 are fully folded and the movable trailer section 32 is fully retracted, the jacks 100 are removed from their supporting position and the folding floor joists 52 and 60 are horizontally folded to their storage positions adjacent to the fixed trailer section 12.

EMBODIMENT OF FIGS. 9 AND 10

A modified trailer construction as shown in FIGS. 9 and 10 utilizes vertically folding floor joists 112 and 114 in substitution for the previously described horizontally folding floor joists 52 and 60 respectively. Track members 116 are utilized in substitution for the previously described track members 42.

Each track member 116 comprises an I-beam member 118 disposed on edge, and a rod 120 welded along the center of the upper flange of the I-beam 118. Each pair of rollers 44 is separated by spacer 50 allowing them to be guided by the rod 120 as they roll over the upper flange of the I-beam 118 astride the rod 120.

A folding floor joist 112 is connected at one of its ends to each of the track members 116 by hinge connection 122. Each floor joist 112 comprises an I-beam member 124 disposed on edge, and a rod 126 welded along the center of its upper flange. The folding floor joists 112 are adapted to swing vertically to a storage position adjacent to the side wall 40 of the movable trailer section 32 when the movable trailer section 32 is in the telescoped, fully retracted position, and, alternately to an extended position forming extensions of track members 116 and providing support for the movable trailer section 32 when fully extended and during the extension or retraction operations.

Intermediate the ends of the fixed trailer section 12 are provided two or more vertically folding floor joists 114 each connected at its one end to beam end 128 of the chassis 14 by hinge connection 122. Beam end 128 is used in lieu of beam end 62 previously described. The folding floor joists 114 are adapted to swing vertically to a storage position adjacent to the side wall 40 of the movable trailer section 32 when the movable trailer section 32 is in the telescoped, fully retracted position, and, alternately to an extended position providing additional support for the movable trailer section 32 when fully extended and during extension or retraction operations. The construction of floor joists 112 and 114 is identical.

The bottom edge of side wall 40 is provided with rollers 44 which roll on the fully extended floor joists 114 when the movable trailer section is being extended or retracted. The beam ends 128 are adapted to permit the rollers 44 to roll from the floor joists 114 unto the beam ends 128 when the movable trailer section 32 is fully retracted. Each beam end 128 has a short rod 130 welded along the center of its upper flange to guide said rollers 44 as they roll on the beam end 128.

When the movable trailer section 32 is in the extended position, suitable jacks 100 may be placed under the outer ends of the folding floor joists 112 and 114 to provide additional support for the movable trailer section 32. The jacks 100 may be arranged to be attached permanently to the folding floor joists 112 and 114.

OPERATION OF FIGS. 9 AND 10

The operation of trailer 10 as shown in FIGS. 9 and 10 is essentially the same as previously described for the embodiment of FIGS. 1 through 8 except that vertically folding floor joists 112 and 114 are utilized. After the trailer 10 has been positioned at the site, the vertically folding floor joists 112 and 114 are folded downward from their vertical storage positions adjacent to the side wall 40 of the movable trailer section 32 into their fully extended positions. The positioning of the jacks 100, extension and retraction of the movable trailer section 32 simultaneous with the respective automatic unfolding and folding of the folding floor unit 66, and the removal of the jacks 100 from their supporting positions is the same as described for the embodiment of FIGS. 1 through 8. The vertically folding floor joists 112 and 114 are then folded upward to storage positions adjacent to the side wall 40 of the movable trailer section 32.

From the foregoing it will be apparent that the present invention provides a novel expansible trailer wherein the two telescoping trailer sections may be laterally expanded and contracted by means of a power cylinder and linking mechanism in a short time with virtually no manual labor required. The present expansible trailer is so arranged that the floor of the movable trailer section automatically unfolds and folds with the simultaneous extension and retraction of the movable trailer section relative to the fixed trailer section. The present expansible trailer also employs novel means for guiding and supporting the movable trailer section during extension and retraction.

Changes may be made in the combination and arrangement of parts or elements as heretofore set forth in the specification and shown in the drawing without departing from the spirit and scope of the invention as defined in the following claims.

What is claimed is:

1. In an expansible trailer having a pair of telescoping trailer sections, wherein one of the trailer sections has a floor foldable vertically along substantially the center thereof, said floor comprising two floor sections, the improvement comprising:
    a power cylinder having one end thereof pivotally connected to one of said floor sections; and
    a link pivotally connected at one end to the opposite end of the cylinder, and pivotally connected at its opposite end to the other floor section.

2. An expansible trailer as defined in claim 1, characterized further to include:
    a second link pivotally connected at one end to the connection between the first mentioned link and the power cylinder, and pivotally connected at its opposite end to the section of the floor to which the power cylinder is connected.

3. An expansible trailer comprising:
    a pair of telescoping trailer sections;
    a foldable floor unit within one of the telescoping trailer sections, said foldable floor unit comprising two floor sections; and
    a hydraulically actuated mechanism positioned below the foldable floor unit and directly interconnecting the two floor sections thereof for folding the floor unit and relatively retracting the trailer sections, and, alternately, unfolding the floor unit and relatively extending the trailer sections.

4. An expansible trailer as defined in claim 3, characterized further to include:
    a plurality of floor joists each pivotally connected at one end to the trailer section having no folding floor, and adapted to swing to a position adjacent to said trailer section, and, alternately, to an extended position underneath the foldable floor unit.

5. An expansible trailer as defined in claim 3, characterized further to include:
    track members on one of the telescoping trailer sections; and
    cooperating rollers carried by the other telescoping trailer section, whereby the telescoping trailer sections are guided between their relatively extended and retracted positions.

6. An expansible trailer comprising:
    a fixed telescoping trailer section;
    a laterally movable telescoping trailer section;
    a folding floor unit, including a pair of foldable sections with a pivotal connection therebetween, one of the foldable sections being pivotally connected at one edge to the fixed telescoping trailer section and the other foldable section being pivotally connected at one edge to the laterally movable telescoping trailer section;
    a plurality of floor joists, each pivotally connected at one end to the fixed telescoping trailer section and adapted to swing to a storage position adjacent to the fixed telescoping trailer section, and, alternately, to an extended position under the folding floor unit; and
    means for folding and unfolding the folding floor unit with the simultaneous resulting relative retraction and extension of the telescoping trailer sections.

7. An expansible trailer as defined in claim 6, further characterized to include:
    track members on the fixed telescoping trailer section; and
    cooperating rollers carried by the laterally movable telescoping trailer section whereby the telescoping trailer sections are guided between their relatively extended and retracted positions.

8. An expansible trailer as defined in claim 6, wherein the means for folding and unfolding the folding floor unit is characterized further to include:
    a power cylinder having one end thereof pivotally connected to the section of the folding floor unit connected to the fixed telescoping trailer section; and
    a link pivotally connected at one end to the opposite end of the cylinder, and pivotally connected at its opposite end to the section of the folding floor unit connected to the laterally movable telescoping trailer section.

9. An expansible trailer as defined in claim 6, wherein the means for folding and unfolding the folding floor unit is characterized further to include:
    a hydraulic cylinder having one end thereof pivotally connected to the section of the folding floor unit connected to the fixed telescoping trailer section;

a first link pivotally connected at one end to the opposite end of the cylinder, and its opposite end pivotally connected to the section of the folding floor unit connected to the laterally movable telescoping trailer section; and a second link pivotally connected at one end to the connection between the first link and the cylinder, and pivotally connected at its opposite end to the section of the folding floor unit connected to the fixed telescoping trailer section.

References Cited

UNITED STATES PATENTS

| | | | |
|---|---|---|---|
| 2,901,282 | 8/1959 | Meaker | 296—23 C |
| 2,790,673 | 4/1957 | Zur Nieden | 296—23 R |

PHILIP GOODMAN, Primary Examiner

U.S. Cl. X.R.

52—67